United States Patent
Song (10) Patent No.: US 11,151,230 B2
(45) Date of Patent: Oct. 19, 2021

(54) USER AUTHENTICATION USING ONE-TIME AUTHENTICATION INFORMATION

(71) Applicant: Hewlett-Packard Development Company, L.P., Spring, TX (US)

(72) Inventor: Ho Jin Song, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/767,723

(22) PCT Filed: Jul. 27, 2018

(86) PCT No.: PCT/KR2018/008508
§ 371 (c)(1),
(2) Date: May 28, 2020

(87) PCT Pub. No.: WO2019/112135
PCT Pub. Date: Jun. 13, 2019

(65) Prior Publication Data
US 2020/0372141 A1    Nov. 26, 2020

(30) Foreign Application Priority Data
Dec. 8, 2017 (KR) .......................... 10-2017-0168712

(51) Int. Cl.
*G06F 21/31* (2013.01)
*G06F 3/12* (2006.01)
*G06F 21/60* (2013.01)

(52) U.S. Cl.
CPC ............ *G06F 21/31* (2013.01); *G06F 3/1222* (2013.01); *G06F 3/1238* (2013.01); *G06F 21/608* (2013.01)

(58) Field of Classification Search
None
See application file for complete search history.

(56) References Cited

U.S. PATENT DOCUMENTS

| | | | |
|---|---|---|---|
| 9,413,753 B2 | 8/2016 | Dietrich et al. | |
| 2006/0101279 A1 | 5/2006 | Akita | |
| 2009/0191857 A1 | 7/2009 | Horn et al. | |
| 2010/0142989 A1 | 6/2010 | Oak | |
| 2014/0073292 A1 | 3/2014 | Kim et al. | |
| 2015/0040202 A1 | 2/2015 | Lee | |
| 2015/0199155 A1 | 7/2015 | Cho et al. | |

(Continued)

FOREIGN PATENT DOCUMENTS

| | | | |
|---|---|---|---|
| JP | 2006-127376 A | 5/2006 |
| JP | 2007-286957 A | 11/2007 |
| JP | 2008-312116 A | 12/2008 |

(Continued)

*Primary Examiner* — Lennin R Rodriguezgonzalez
(74) *Attorney, Agent, or Firm* — Jefferson IP Law, LLP (57) ABSTRACT

An image forming apparatus and a method for authenticating a user using one-time authentication information are provided. The image forming apparatus includes a processor and a memory storing instructions executable by the processor. The processor may execute the instructions to obtain one-time authentication information from a user, authenticate the obtained one-time authentication information by using previously stored one-time authentication information, and display a user interface where a function corresponding to the authenticated one-time authentication information is activated according to a result of the authentication.

20 Claims, 8 Drawing Sheets

(56) References Cited

U.S. PATENT DOCUMENTS

2016/0226855 A1  8/2016  Takeo

FOREIGN PATENT DOCUMENTS

| | | |
|---|---|---|
| JP | 2011-181063 A | 9/2011 |
| JP | 2011-198017 A | 10/2011 |
| JP | 2012-64229 A | 3/2012 |
| JP | 2013-186642 A | 9/2013 |
| JP | 6164154 B2 | 7/2017 |
| KR | 10-0556851 B1 | 3/2006 |
| KR | 10-2006-0109001 A | 10/2006 |
| KR | 10-2007-0100179 A | 10/2007 |
| KR | 10-2009-0022425 A | 3/2009 |

| ID | VALID PERIOD/NUMBER OF TIMES | | |
|---|---|---|---|
| | Start Date | End Date | Count |
| OTA123 | 20170701 | 20170731 | |
| ALLOWABLE AUTHORITY | | | |
| ADMIN | GENERAL | GUEST | Tech Mode |
| | 1 | | |
| ALLOWABLE FUNCTION | | | |
| Scan | Fax | Copy | Settings |
| | ○ | ○ | |
| USER INFORMATION | | IMAGE FORMING APPARATUS INFORMATION | |
| Email | Mobile | S/N | IPv4 |
| | | SEC134841258 | |

501 — ID
502 — VALID PERIOD/NUMBER OF TIMES
503 — ALLOWABLE AUTHORITY
504 — ALLOWABLE FUNCTION
505 — USER INFORMATION
506 — IMAGE FORMING APPARATUS INFORMATION

[Fig. 6]

| ONE-TIME AUTHENTICATION INFORMATION MANAGEMENT | | | | |
|---|---|---|---|---|
| SELECTED : 0 \| TOTAL : 0 | | | | |
| ADD | EDIT | DELETE | DETAILS | TRANSMIT |
| ☐ Device Name | Device Information(Serial Number/IPv4 Address) | | | Date(YYYY-MM-DD ~ YYYY-MM-DD) |
| ☐ Device1 | SEC1234567890/192.168.123.111 | | | 2017-07-01 ~ 2017-07-31 |
| ☐ Device2 | SEC2345678901/192.168.123.222 | | | 2017-07-01 ~ 2017-07-31 |

601 — ONE-TIME AUTHENTICATION INFORMATION MANAGEMENT
602 — ADD/EDIT
603 — DELETE
604 — DETAILS
605 — TRANSMIT
606 — Device list

[Fig. 7]

|  | ONE-TIME AUTHENTICATION INFORMATION ADDITION |
|---|---|
|  | APPLY  REVERSE  CANCEL |

701 — · USER INFORMATION    Browse —702
    Email
    Mobile 703 — · IMAGE FORMING APPARATUS INFORMATION    Browse —704
    Device Name
    Serial Number
    IPv4 Address 705 — · AUTHORITY
    ☐ Service (Tech Mode/Service Mode)
       This is only for employee of hp customer service center.
       It is required Email that contains'@hp.com'.
    ☐ ADMIN
    ☐ GENERAL_USER
    ☐ GUEST
    ☐ DEPENDING ON EACH FUNCITON
       ☐ Copy ☐ Print ☐ Scan ☐ Fax ☐ Settings 706 — · PERIOD/NUMBER OF TIMES
    [          ] ~ [          ] / [    ]

[Fig. 8]

| USER INFORMATION | | |
|---|---|---|
| | | CANCEL |
| USER INFORMATION SEARCH | | FIND — 801 |
| Email | | Mobile |
| sample1@hp.com | | 010-0000-0000 |
| sample2@hp.com | | − |
| − | | 010-0000-0000 |

[Fig. 9]

| IMAGE FORMING APPARATUS INFORMATION | | |
|---|---|---|
| | APPLY | CANCEL |
| IMAGE FORMING APPARATUS SEARCH | | FIND — 901 |
| ☐ SELECT ALL | Serial Number | IPv4 Address |
| ☐ | SEC1234567890 | 192.168.123.111 |
| ☐ | SEC2345678901 | 192.168.123.222 |
| ☐ | SEC3456789012 | 192.168.123.333 |

[Fig. 10]

| ONE-TIME AUTHENTICATION INFORMATION MANAGEMENT | | | | | |
|---|---|---|---|---|---|
| SELECTED : 0 / TOTAL : 0 | | | | | |
| ADD | EDIT | DELETE | DETAILS | TRANSMIT | |
| ☐ | Device Name | Device Information(Serial Number/IPv4 Address) | | | Date(YYYY-MM-DD) |
| ☐ | Device1 | SEG1234567890 / - | | | 2017-07-01 ~ 2017-07-31 |

1001

TRANSMIT

APPLY   CANCEL

· USER INFORMATION

☒ Email     sample1@hp.com
☒ Mobile    010-0000-0000

[Fig. 11]

USER AUTHENTICATION USING ONE-TIME AUTHENTICATION INFORMATION

BACKGROUND ART

General methods for authenticating a user in an image forming apparatus include a method of using something known to the user, a method of using an item the user possesses, and a method of using a unique characteristic of the user.

The method of using something known to the user includes a method of inputting secret information remembered by the user to identify himself or herself and comparing and verifying the input secret information. As an example, an ID and a password of the user may be used. Other examples of the secret information include a personal identification number (PIN) and a lock number.

The method of using an item the user possesses is a method of using a security medium the user individually possesses for comparison and verification purposes to check the user's identity. Examples of the security medium include a user authentication ticket, a user authentication token, a staff badge, and a pass as keys corresponding to a lock. Lastly, the method of using a unique characteristic of the user involves using the user's physical information, and includes a fingerprint recognition method, a face recognition method, an iris recognition method, or the like.

DISCLOSURE OF INVENTION

Brief Description of Drawings

The above and other aspects, features, and advantages of certain examples of the disclosure will be more apparent from the following description taken in conjunction with the accompanying drawings, in which.

Throughout the drawings, it should be noted that like reference numbers are used to depict the same or similar elements, features, parts, components, and structures.

MODE FOR THE INVENTION

As used herein, the term "and/or" includes any and all combinations of one or more of the associated listed items. Expressions such as "at least one of," when preceding a list of elements, modify the entire list of elements and do not modify the individual elements of the list.

An "image forming apparatus" may denote any apparatus capable of performing an image forming job, such as a printer, a copier, a scanner, a fax machine, a multifunction printer (MFP), or a display apparatus. Also, "print data" may denote data converted to a format printable by a printer and a "scan file" may denote a file generated by scanning an image by a scanner.

Examples of the disclosure relate to an image forming apparatus and a method of controlling the image forming apparatus, and details that are well-known to one of ordinary skill in the art will not be described.

The examples described herein relate to an image forming apparatus and a method of controlling an image forming apparatus, and details that are well-known to one of ordinary skill in the art will not be described. The examples described hereinafter may be modified in many different forms.

Figure 1:
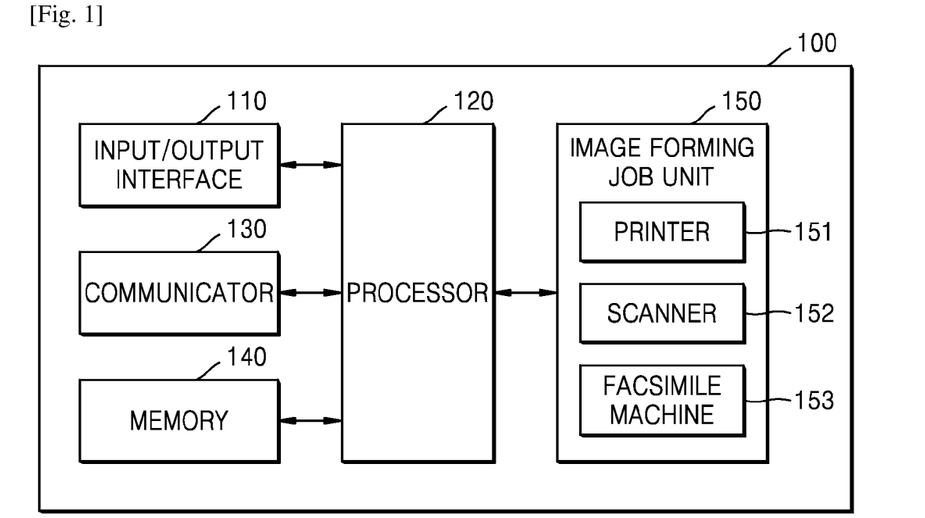
FIG. 1 is a diagram illustrating a configuration of an image forming apparatus according to an example.

FIG. 1 is a diagram illustrating a configuration of an image forming apparatus according to an example.

Referring to FIG. 1, an image forming apparatus 100 may include an input/output interface 110, a processor 120, a communicator 130, a memory 140, and an image forming job unit 150. Although not illustrated, the image forming apparatus 100 may further include a power supply for supplying power to each component.

The input/output interface 110 may include an input interface for receiving an input for performing an image forming job from a user, and an output interface for displaying information, such as a result of performing an image forming job or a state of the image forming apparatus 100. For example, the input/output interface 110 may include an operation panel for receiving a user input and a display panel for displaying a screen.

In more detail, the input interface may include a device for receiving various types of user inputs, such as a keyboard, a physical button, a touch screen, a camera, a microphone, or the like. Also, the output interface may include, for example, a display panel, a speaker, or the like. However, the input/output interface 110 is not limited thereto and may include any device supporting various inputs and outputs.

The processor 120 may control overall operations of the image forming apparatus 100, and may include at least one processor, such as a central processing unit (CPU). The processor 120 may control other components included in the image forming apparatus 100 to perform an operation corresponding to a user input received through the input/output interface 110. The processor 120 may include at least one specialized processor for each function or may be an integrated processor. For example, the processor 120 may execute a program stored in the memory 140, read data or a file stored in the memory 140, or store a new file in the memory 140.

The communicator 130 may communicate with another device or a network in a wired or wireless manner. To this end, the communicator 130 may include a communication module, such as a transceiver, supporting at least one of various wired/wireless communication methods. For example, the communication module may be in a form of a chipset, may be a sticker/barcode (for example, a sticker including a nearfield communication (NFC) tag) containing information required for communication, or the like.

The wireless communication may include at least one of, for example, wireless fidelity (Wi-Fi), Wi-Fi direct, Bluetooth, ultra-wideband (UWB), NFC, or the like. The wired communication may include at least one of, for example, a universal serial bus (USB), a high definition multimedia interface (HDMI), or the like.

The communicator 130 may be connected to an external apparatus located outside the image forming apparatus 100 to transmit or receive a signal or data and may be connected to a server to transmit or receive a signal or data. Also, the communicator 130 may be connected to a host apparatus through the server. In other words, the communicator 130 of the image forming apparatus 100 may transmit or receive a signal or data to or from a communicator of the host apparatus through the server.

The image forming job unit 150 may perform an image forming job, such as printing, copying, scanning, faxing, displaying, or the like.

Although FIG. 1 illustrates the image forming job unit 150 including a printer 151, a scanner 152, and a facsimile machine 153, the image forming job unit 150 may include only some of them or may further include a component for performing another type of image forming job according to needs.

The printer 151 may form an image on a recording medium, using any one of various printing methods, such as an electro-photography method, an inkjet method, a thermal transfer method, a thermo-sensitive method, or the like.

The scanner 152 may radiate light onto paper or another recording medium and may read an image recorded on the paper by receiving light reflected from the paper onto an image sensor. A charge-coupled device (CCD) or a contact type image sensor (CIS) may be used as the image sensor for reading an image from paper. The scanner 152 may have a flatbed structure, a document feed structure, or a combination thereof, wherein, in the flatbed structure, the paper is located at a fixed location and the image is read while the image sensor moves, and in the document feed structure, the image sensor is located at a fixed location and the paper is fed.

In the facsimile machine 153, a component for scanning an image may be shared with the scanner 152, and a component for printing a received file may be shared with the printer 151. The facsimile machine 153 may transmit a scan file to a destination or may receive a file from an external source.

Names of the above components of the image forming apparatus 100 may be changed. Also, the image forming apparatus 100 may include at least one of the above components, and may not include some of the above components or may further include an additional component.

The input/output interface 110 of FIG. 1 may include an independent control system. In other words, independently of the processor 120 of the image forming apparatus 100, the input/output interface 110 may include a control system (e.g., a processor, a memory, etc.) for controlling a user interface (UI) provided by the input/output interface 110. Also, an operating system (OS) for providing a UI and programs such as applications for supporting various functions may be installed in the control system of the input/output interface 110. As another example, the OS for providing the UI and the programs and applications may be installed in the memory 140 and accessed by the user interface device 110.

Figure 2:
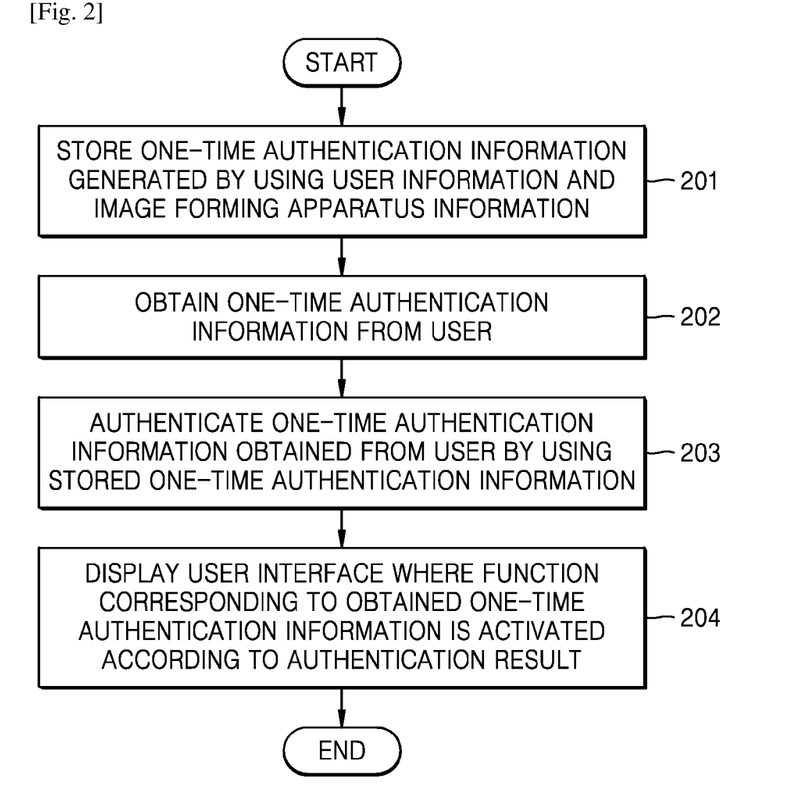
FIG. 2 is a flowchart illustrating a method of authenticating one-time authentication information according to an example.

FIG. 2 is a flowchart illustrating a method of authenticating one-time authentication information according to an example.

Referring to FIG. 2, "one-time authentication (OTA) information" refers to information required for a user to use a management function of an image forming apparatus. The OTA information may be generated by an image forming apparatus. The OTA information may be a file that has a unique identification (ID) as a file name and may be a file that has a unique structure. According to an example, the OTA information may be generated by using user information and image forming apparatus information. The OTA information may include information regarding a user's authority, information regarding a function available to the user, information regarding the number of possible authentications for the OTA information, or the like. The OTA information may include pieces of information related to encrypted authentication.

In operation 201, an image forming apparatus may store OTA information generated by using user information and image forming apparatus information.

According to an example, the OTA information may be generated by matching functions of the image forming apparatus with the user information. For example, the OTA information may be information obtained by matching authorities for performing function a and function b of image forming apparatus A with identification information of user A. Alternatively, the OTA information may be information obtained by matching authorities for performing function b and function c of image forming apparatus A with identification information of user B.

The image forming apparatus may store the OTA information in an internal storage apparatus and may transmit the OTA information to an external storage apparatus or an external storage server. The image forming apparatus may update, delete, or correct the OTA information stored in the internal storage apparatus, the external storage apparatus, or the external storage server.

In operation 202, the image forming apparatus may obtain OTA information from a user.

According to an example, the image forming apparatus may receive an ID corresponding to the OTA information from the user through a user interface. For example, the image forming apparatus may provide a user interface that requests an ID corresponding to the OTA information to a user that desires access, such as in an administrator mode. The user may input the ID corresponding to the OTA information through the user interface.

According to an example, the image forming apparatus may obtain a file including the OTA information through an input/output interface. For example, when an external device such as a USB, an external hard disc drive, a user terminal, etc. is connected to the image forming apparatus, the image forming apparatus may obtain a file including the OTA information from the external device. The image forming apparatus may obtain the OTA information by checking structure characteristics of the file including the OTA information.

In operation 203, the image forming apparatus may authenticate the OTA information obtained from the user by using the stored OTA information.

According to an example, the image forming apparatus may check whether the OTA information obtained from the user is stored in a storage unit. According to an example, when the obtained OTA information is stored in the storage unit, the image forming apparatus may check the validity of the OTA information. According to an example, the image forming apparatus may check user authority corresponding to the OTA information. According to an example, the image forming apparatus may check a function corresponding to the OTA information.

In operation 204, the image forming apparatus may display a user interface where a function corresponding to the obtained OTA information is activated according to an authentication result.

According to an example, the image forming apparatus may display information such as authentication success, authentication failure, authentication expiration, or the like.

Figure 3:
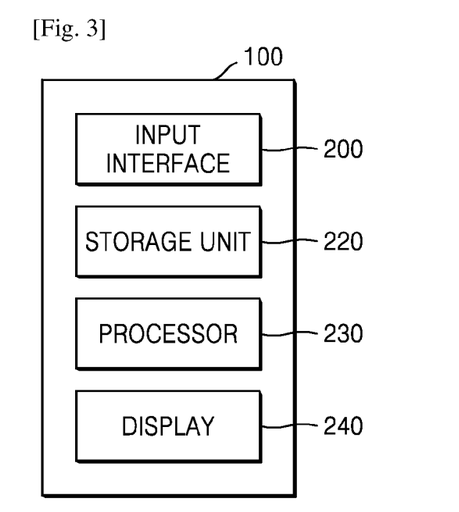
FIG. 3 is a diagram illustrating a configuration of an image forming apparatus according to an example.

FIG. 3 is a diagram illustrating a configuration of an image forming apparatus according to an example.

Referring to FIG. 3, the image forming apparatus 100 may include an input interface 200, a storage unit 220, a processor 230, and a display 240.

According to an example, the input interface 200 may obtain OTA information from a user. The input interface 200 may include an apparatus capable of receiving various types of user inputs, for example, a keyboard, a physical button, a touchscreen, a camera, a microphone, or the like.

According to an example, the input interface 200 may include one of an HDMI port, a component jack, a personal computer (PC) port, a USB port, or the like. The input interface 200 may include a combination of the HDMI port, the component jack, the PC port, the USB port, or the like.

It will be easily understood by one of ordinary skill in the art that configurations and operations of the input interface 200 may be variously implemented according to examples of the disclosure.

According to an example, the storage unit 220 may store previously generated OTA information. The storage unit 220 may store user identification information and identification information of an image forming apparatus required to generate OTA information.

The storage unit 220 may store various pieces of data, programs or applications for driving and controlling the image forming apparatus 100 according to control by the processor 230. The storage unit 220 may store a control program for controlling the image forming apparatus 100 and the processor 230, an application initially provided by a manufacturer or downloaded from an external source, a graphical user interface (GUI) related to the application, an object (for example, image text, a button, etc.) for providing the GUI, user information, a document, databases, pieces of related data, or the like.

According to an example, the processor 230 may authenticate the OTA information obtained from the user by using the OTA information stored in the storage unit 220. According to an example, the processor 230 may check whether the obtained OTA information is stored in the storage unit 220. According to an example, the processor 230 may check user authority corresponding to the OTA information.

According to an example, the processor 230 may request the user for additional authentication information according to an authentication result of the OTA information. The processor 230 may make the request when, even though the OTA information is stored in the image forming apparatus 100, the number of possible authentications left is 0, a period available for authentication expires, or the like.

According to an example, the additional authentication information may be authentication information required to enhance security. A method of inputting the additional authentication information may include mobile tagging, staff badge tagging, manager ID/password (PW) input, physical information input, user identification information input, additional identification number input, etc.

The processor 230 may generate OTA information by using user information previously stored in the storage unit 220 and identification information of an image forming apparatus.

According to an example, as OTA information is generated by using previously stored user information, security power of OTA information that allows access in an administration mode may be enhanced.

According to an example, the processor 230 may generate OTA information and may transmit the OTA information to a user contact address included in the OTA information. For example, the user contact address may include a mail address, a phone number, a social network service (SNS) account, etc.

According to an example, the display 240 may display a function corresponding to the OTA information authenticated based on a determination of the processor 230. The display 240 may generate a drive signal by converting an image signal, a data signal, an on-screen display (OSD) signal, a control signal, etc. processed in the processor 230. When the display 240 and a touchpad constitute a layer structure and thus are configured as a touchscreen, the display 240 may also be used as an input apparatus in addition to an output apparatus. The display 240 may include at least one of a liquid crystal display, a thin film transistor-liquid crystal display, an organic light-emitting diode display, a flexible display, a three-dimensional (3D) display, an electrophoretic display, or the like.

Figure 4:
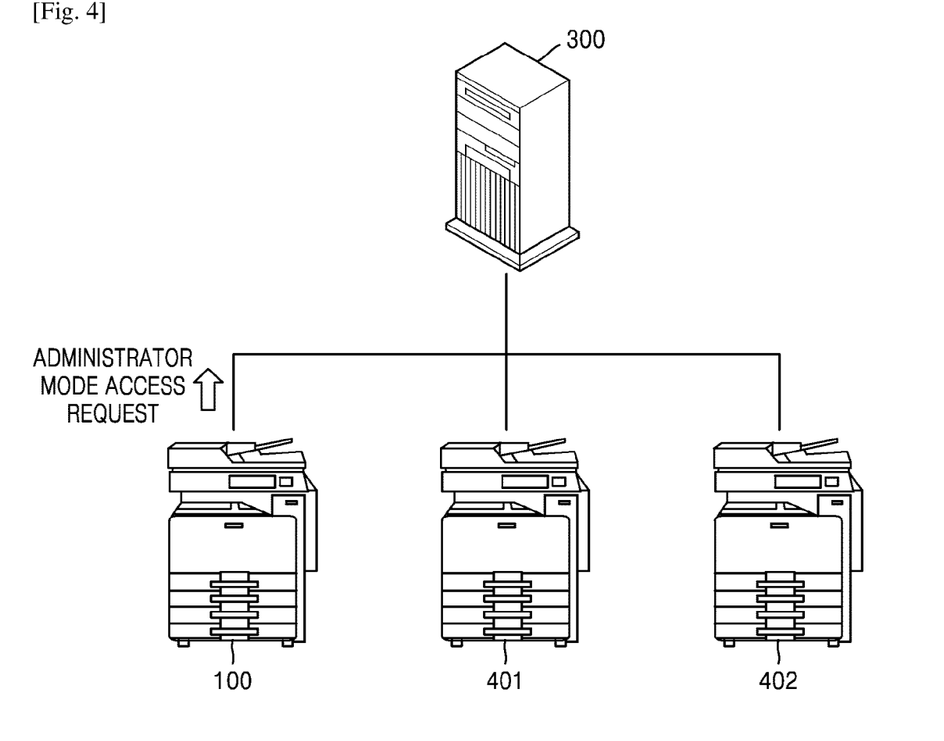
FIG. 4 is a diagram illustrating a plurality of image forming apparatuses communicating with an authentication server according to an example.

FIG. 4 is a diagram illustrating a plurality of image forming apparatuses communicating with an authentication server according to an example.

Referring to FIG. 4, OTA information of a plurality of image forming apparatuses 100, 401, and 402 may be authenticated by using an authentication server 300.

According to an example, the authentication server 300 may be connected to the plurality of image forming apparatuses 100, 401, and 402 through a network. The authentication server 300 may store identification information of each of the plurality of image forming apparatuses 100, 401, and 402 and user information for managing each of the plurality of image forming apparatuses 100, 401, and 402. According to an example, when the authentication server 300 obtains OTA information from any of the plurality of image forming apparatuses 100, 401, and 402, the authentication server 300 may authenticate the OTA information by using a storage unit of the authentication server 300.

According to various examples, the plurality of image forming apparatuses 100, 401, and 402 may correspond to different pieces of OTA information or may correspond to the same OTA information. According to an example, when the plurality of image forming apparatuses 100, 401, and 402 include the same OTA information, a user may control functions of the plurality of image forming apparatuses 100, 401, and 402 by using one piece of OTA information.

Figure 5:
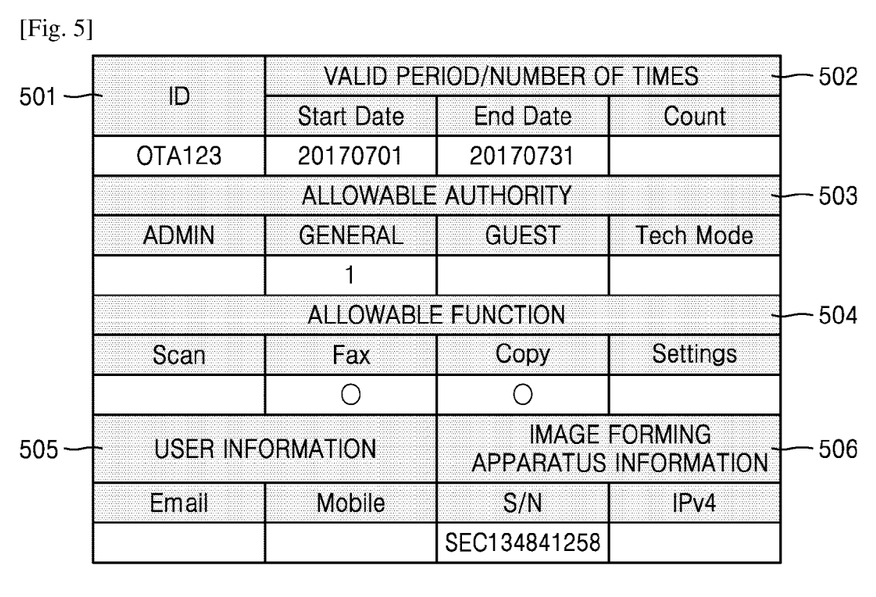
FIG. 5 is a diagram illustrating one-time authentication information according to an example.

FIG. 5 is a diagram illustrating OTA information according to an example.

Referring to FIG. 5, OTA information may include an ID 501, a valid period/number of times 502, an allowable authority 503, an allowable function 504, user information 505, image forming apparatus information 506, or the like.

The image forming apparatus 100 may generate the ID 501 uniquely corresponding to one piece of OTA information.

When the image forming apparatus 100 generates OTA information, the image forming apparatus 100 may determine the valid period/number of times 502 available for authentication. As an example, the valid period/number of times 502 may refer to a period during which OTA information is valid. The image forming apparatus 100 may set an authentication start date (Start Date) and an authentication end date (End Date). For example, the image forming apparatus 100 may set a period from Jul. 1, 2017 to Jul. 31, 2017 as a period available for authentication.

As another example, when the image forming apparatus 100 generates OTA information, the image forming apparatus 100 may determine the number of authentications (count) and thus may set the number of authentications available during a predetermined period. For example, the number of authentications (count) may be set as 5, which means that OTA information is valid five times during a predetermined valid period. As another example, the number of authentications (count) may be set without an associated predetermined valid period. In that case, the number of authentications (count) may be set as 5, which means that OTA information is valid five times without a period limitation. Of course, it is understood that the number of authentications (count) may be set to less than or greater than 5.

When the image forming apparatus 100 generates OTA information, the image forming apparatus 100 may set the allowable authority 503. According to an example, the allowable authority 503 may refer to an authority of using or controlling a function of the image forming apparatus 100. The allowable authority 503 may include an administrator (Admin) mode, a general (General) mode, a guest (Guest) mode, a technology (Tech) mode, or the like.

When a user logs in with OTA information including an authority of an administrator mode, the image forming apparatus 100 may generate new OTA information or correct existing OTA information.

When OTA information corresponds to the general (General) mode, the guest (Guest) mode, or the technology (Tech) mode, the image forming apparatus 100 may not generate new OTA information or correct OTA information.

When OTA information corresponds to the general (General) mode or the guest (Guest) mode, the image forming apparatus 100 may access only the function set for each mode.

When the image forming apparatus 100 authenticates OTA information corresponding to the technology (Tech) mode, the image forming apparatus 100 may provide a user interface for changing settings of the image forming apparatus 100.

When the image forming apparatus 100 generates OTA information, the OTA information may be generated by matching a function of the image forming apparatus 100. For example, OTA information may be generated by designating at least one of scanning, faxing, copying, and printing settings, which are functions of the image forming apparatus 100.

The image forming apparatus 100 may generate OTA information by using the user information 505. The image forming apparatus 100 may generate OTA information by using previously stored user information. According to an example, user information for generating OTA information may be determined by a predetermined criterion. For example, the user information may include the staff of a company using an image forming apparatus, the staff of a company repairing the image forming apparatus, the staff of a company installing the image forming apparatus, etc.

According to an example, the image forming apparatus 100 may generate OTA information by using the image forming apparatus information 506. According to an example, the image forming apparatus information 506 may include serial number (S/N) and internet protocol version 4 (IPv4) information. According to an example, the image forming apparatus information 506 may further include unique identification information of the image forming apparatus 100.

Figure 6:
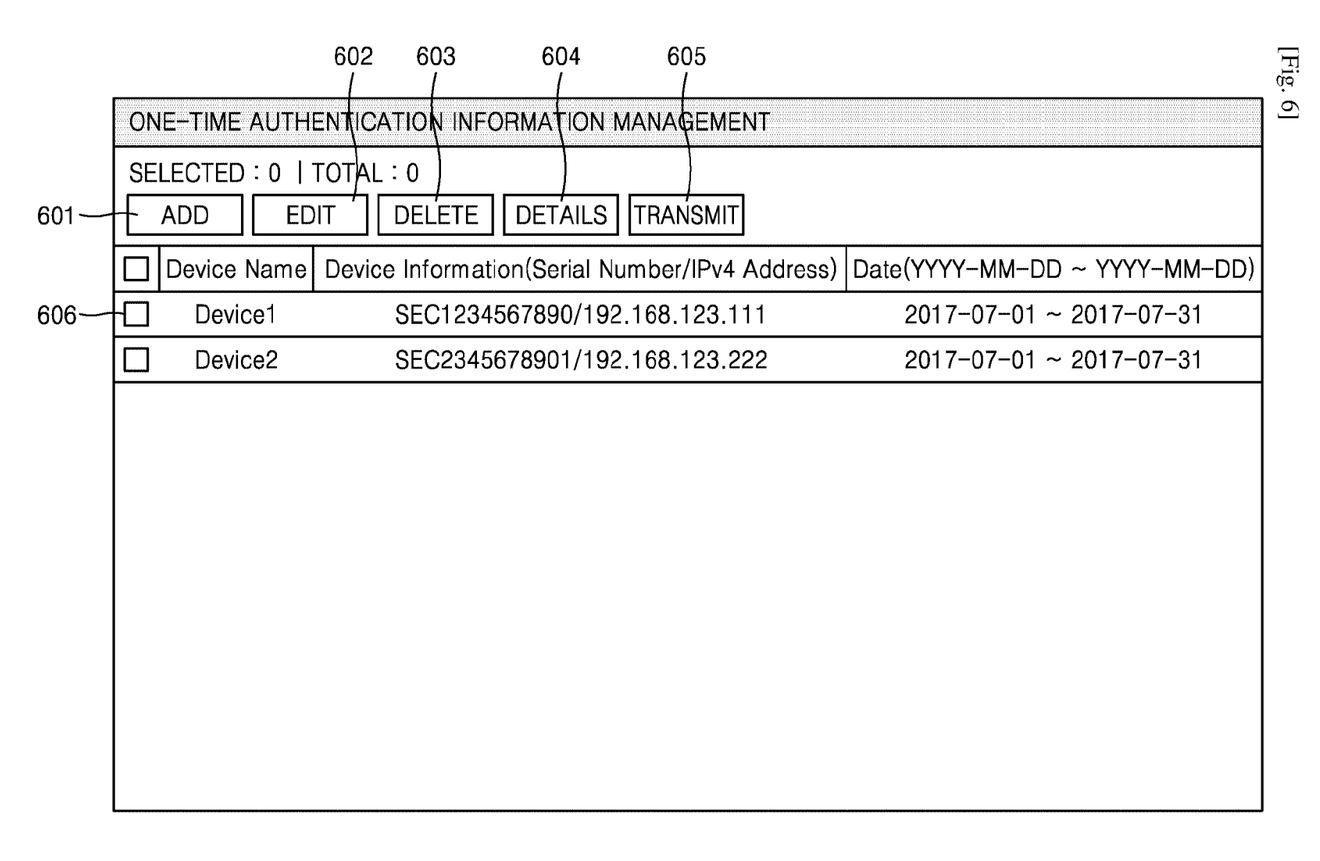
FIG. 6 is a diagram illustrating a user interface for managing one-time authentication information according to an example.

FIG. 6 is a diagram illustrating a user interface for managing OTA information according to an example.

Referring to FIG. 6, the image forming apparatus 100 may provide a user interface for managing stored OTA information or adding new OTA information.

When an add button 601 is selected, new OTA information may be added. According to an example, a user that is assigned an administrator authority may add new OTA information.

When an edit button 602 is selected, previously registered OTA information may be corrected or otherwise changed. For example, a valid period/number of times, an authority for use, a function, etc. corresponding to the OTA information may be corrected or changed. Contact address information of user information corresponding to the OTA information may also be corrected or changed.

When a delete button 603 is selected, at least one piece of previously registered OTA information may be deleted. When a user selects pieces of registered OTA information, the selected pieces of OTA information may be deleted at the same time.

When a details button 604 is selected, details of previously registered OTA information may be checked. For example, identification information of an image forming apparatus, user identification information, a valid period, the number of possible authentications, an authority for use, a function, etc. corresponding to the OTA information may be checked.

When a transmit button 605 is selected, OTA information may be transmitted to the outside, such as an external device. For example, when a user presses a select button 606 of Device 1 and selects the transmit button 605, the image forming apparatus 100 may transmit OTA information of Device 1 to the outside. In the example, the image forming apparatus 100 may transmit OTA information of Device 1 to a user terminal, the user's e-mail, an SNS account, etc.

Figure 7:
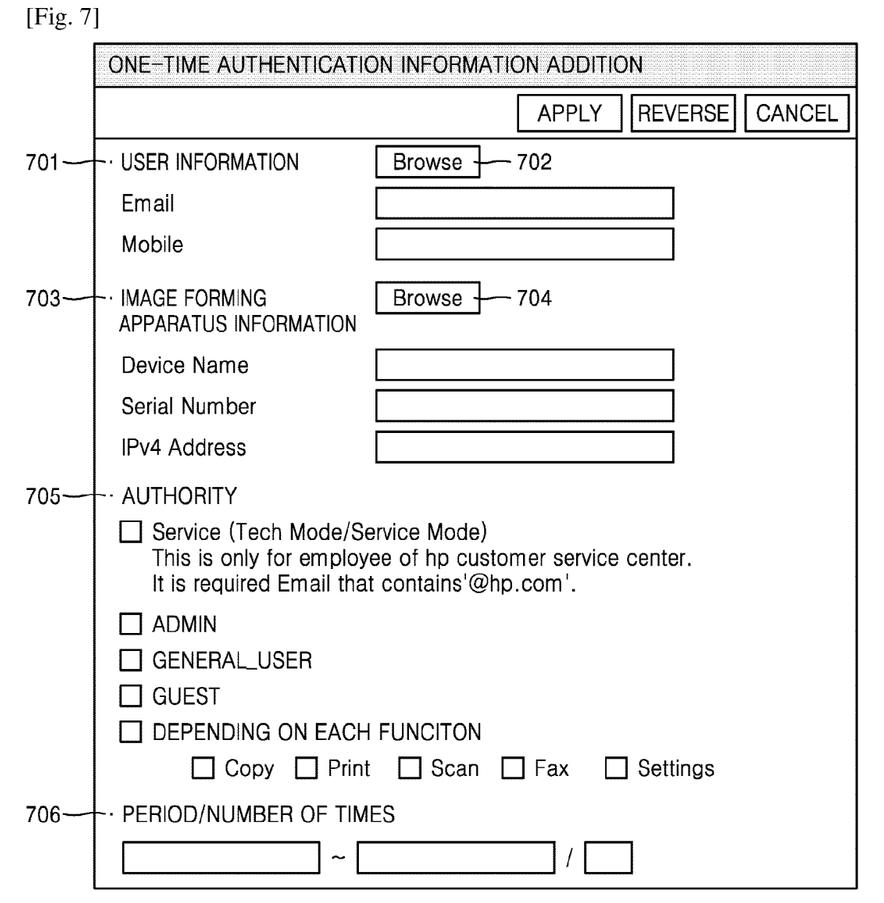
FIG. 7 is a diagram illustrating a user interface for adding one-time authentication information according to an example.

FIG. 7 is a diagram illustrating a user interface for adding OTA information according to an example.

Referring to FIG. 7, the user interface is a user interface for adding OTA information. The user interface of FIG. 7 may be displayed to a user that accesses with an administrator authority.

The image forming apparatus 100 may generate OTA information by using user information 701 and image forming apparatus identification information 703 and may set an authority 705 and a period/number of times available for authentication 706 which may be used to generate OTA information.

The image forming apparatus 100 may generate OTA information by using previously registered user information. When a user presses a Browse button 702, the image forming apparatus 100 may display a list of pieces of previously registered user information. When one is selected from the displayed list of pieces of previously registered user information, the image forming apparatus 100 may display the selected user information.

The image forming apparatus 100 may generate OTA information by using previously registered image forming apparatus identification information. When the user presses a Browse button 704, the image forming apparatus 100 may display a list of pieces of previously registered image forming apparatus identification information. The list of pieces of previously registered image forming apparatus identification information may be displayed through a pop-up window. When one is selected from the displayed list of pieces of previously registered image forming apparatus identification information, the image forming apparatus 100 may display the selected image forming apparatus identification information.

When setting the authority 705, the image forming apparatus 100 may set a specific authority only to a specific user. For example, only when a domain of user mail corresponding to user information is '@hp.com', the image forming apparatus 100 may set a service authority.

Figure 8:
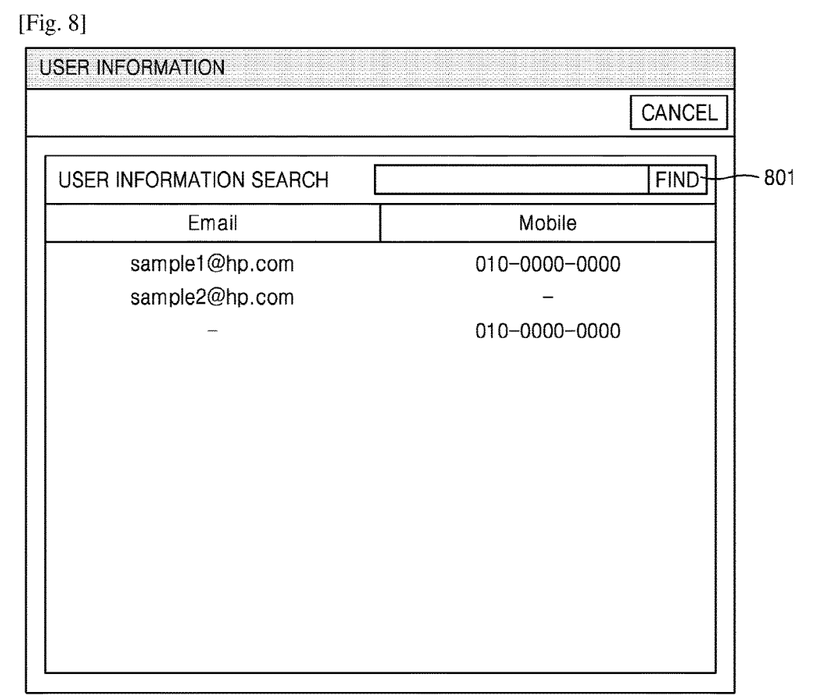
FIG. 8 is a diagram illustrating a user interface for searching for user information for generating one-time authentication information according to an example.

FIG. 8 is a diagram illustrating a user interface for searching for user information for generating OTA information according to an example.

Referring to FIG. 8, when a user presses the Browse button 702 on the user interface of FIG. 7, the image forming apparatus 100 may display a user interface screen of FIG. 8.

Since the image forming apparatus 100 generates OTA information by using previously registered user information, the image forming apparatus 100 may generate OTA information with enhanced security. Also, the image forming apparatus 100 may generate OTA information with enhanced security by setting a specific function and authority so as to correspond to OTA information.

In an example, the image forming apparatus 100 may search for user information by using the user's email, mobile terminal information, or the like. The image forming apparatus 100 may search for every piece of registered user information. When the user selects a find button 801, the image forming apparatus 100 may search for user information that matches a condition input by the user.

Figure 9:
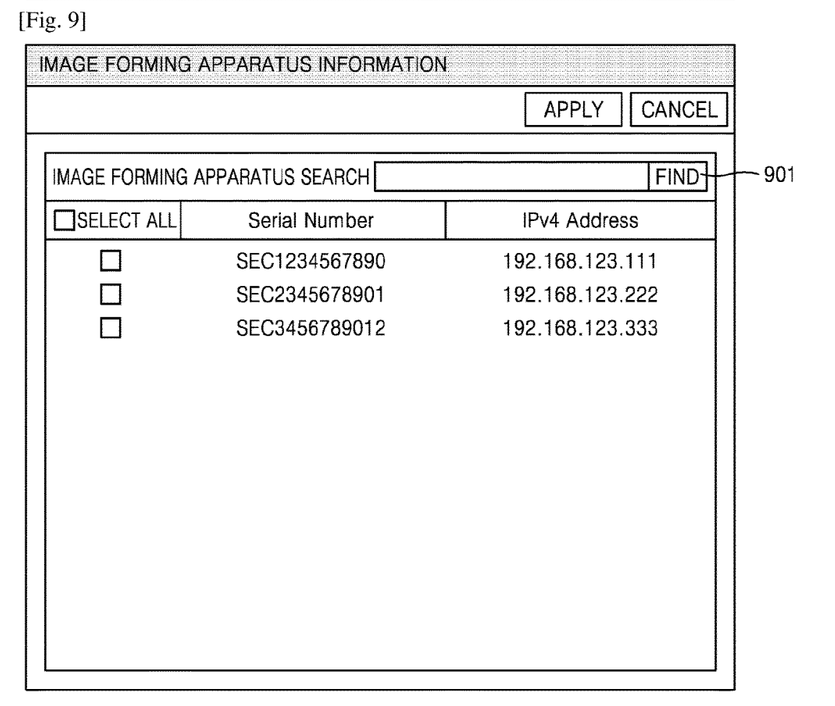
FIG. 9 is a diagram illustrating a user interface for searching for image forming apparatus information for generating one-time authentication information according to an example.

FIG. 9 is a diagram illustrating a user interface for searching for image forming apparatus information for generating OTA information according to an example.

Referring to FIG. 9, when a user presses the Browse button 704 on the user interface of FIG. 7, the image forming apparatus 100 may display a user interface screen of FIG. 9.

Since the image forming apparatus 100 generates OTA information by using previously registered image forming apparatus identification information, the image forming apparatus 100 may generate OTA information with enhanced security.

According to an example, image forming apparatus identification information may include an SN or IPv4 address information of the image forming apparatus 100. When the user selects a find button 901, the image forming apparatus 100 may search for registered image forming apparatus identification information by using an SN or IPv4 address information.

Figure 10:
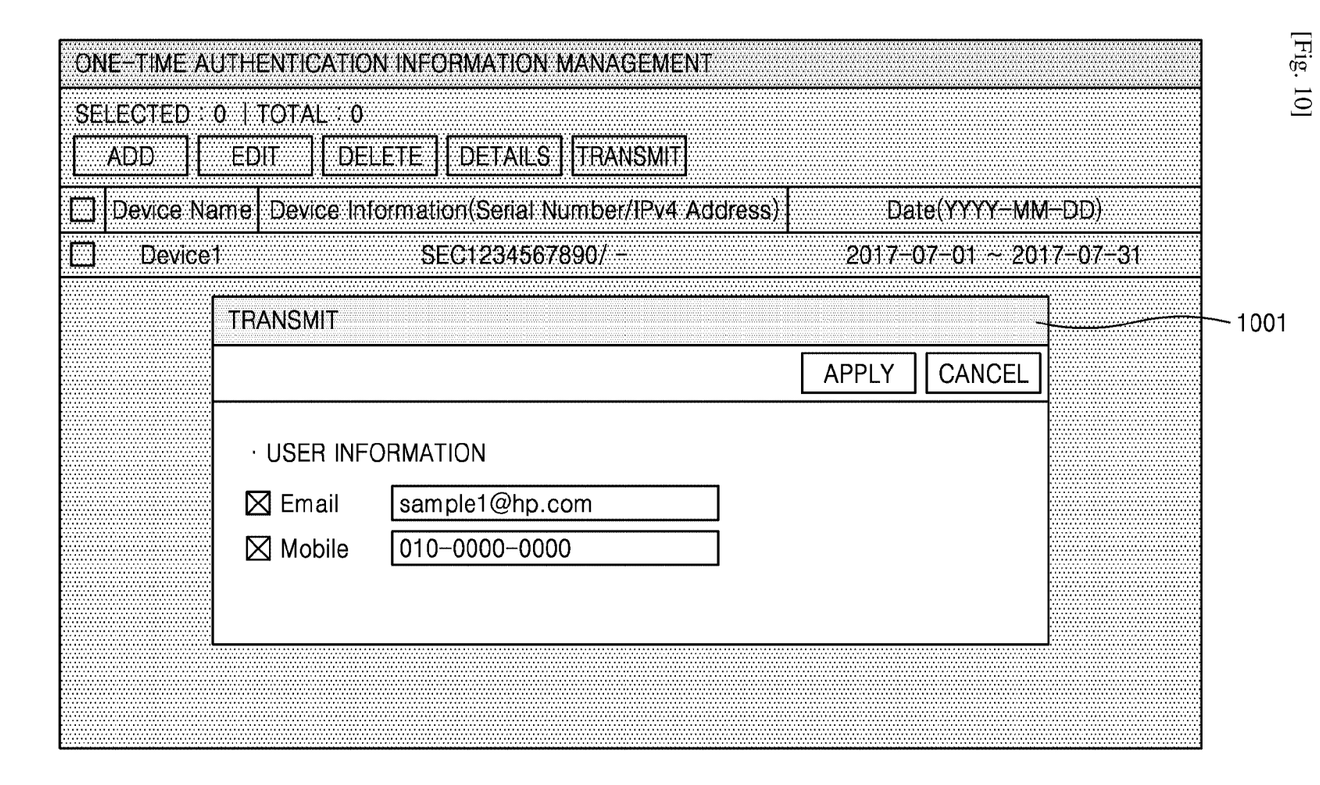
FIG. 10 is a diagram illustrating a user interface for externally transmitting one-time authentication information according to an example.

FIG. 10 is a diagram illustrating a user interface for externally transmitting OTA information according to an example.

Referring to FIG. 10, when a user presses the transmit button 605 on the user interface of FIG. 6, the image forming apparatus 100 may display a user interface screen 1001.

The image forming apparatus 100 may externally transmit OTA information to an external device, an external server, or the like. As an example, the image forming apparatus 100 may transmit OTA information to an email, SNS, the cloud, a mobile terminal, etc. registered on user information by using a network.

The image forming apparatus 100 may externally transmit a file including OTA information. The file including OTA information has a unique structure. For example, the file including OTA information may have a special structure through unique record organization, record arrangement, record index structure, etc.

According to an example, the image forming apparatus 100 may determine a structure of a file including OTA information and thus may determine whether the OTA information is valid or not. According to an example, when an external apparatus such as a user terminal, a USB device, etc. is connected to the image forming apparatus 100, the image forming apparatus 100 may obtain a file including OTA information by checking a structure of the file.

Figure 11:
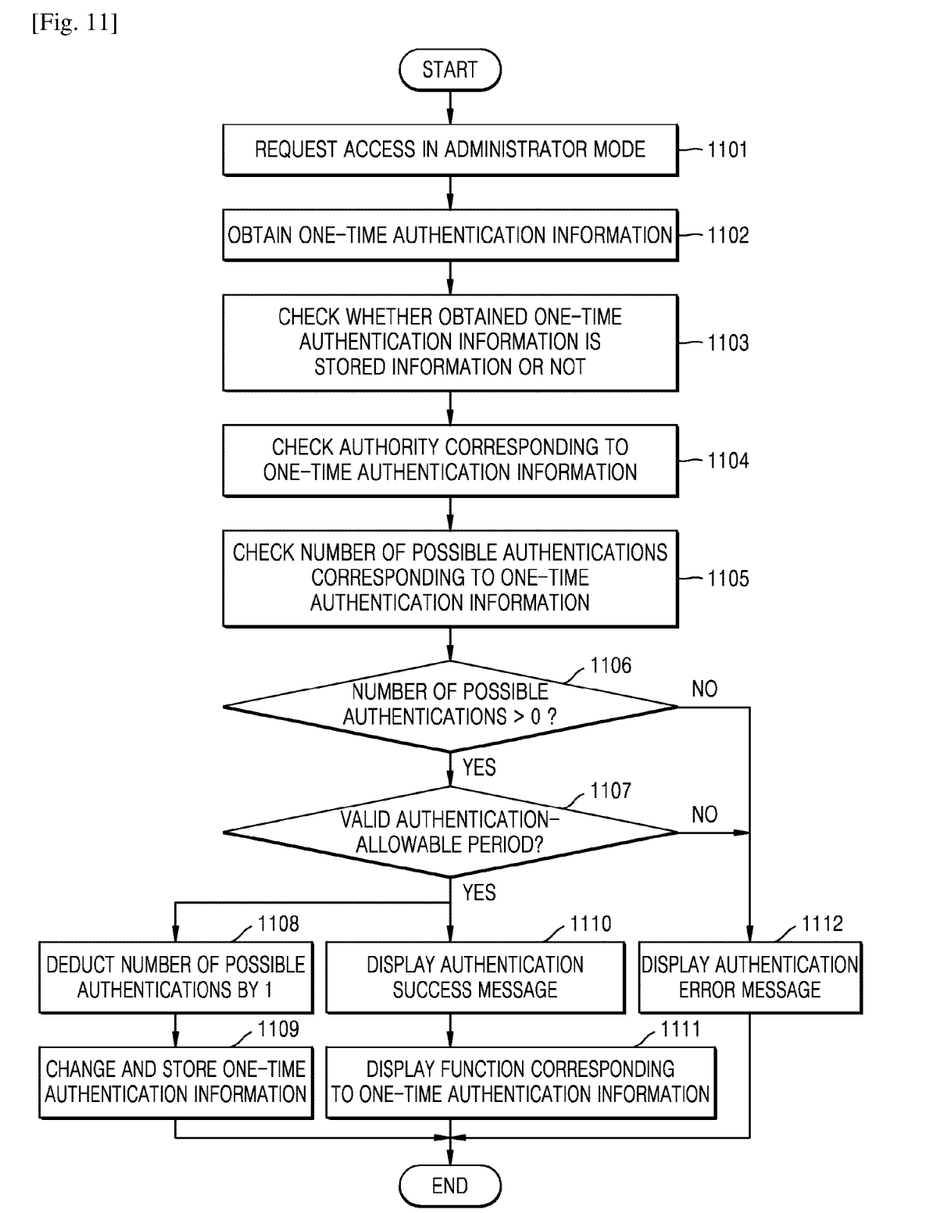
FIG. 11 is a flowchart illustrating a method of accessing in an administrator mode by using one-time authentication information according to an example.

FIG. 11 is a flowchart illustrating a method of accessing in an administrator mode by using OTA information according to an example.

Referring to FIG. 11, the image forming apparatus 100 may receive a request for accessing in an administrator mode in operation 1101. According to an example, the administrator mode may be a mode for using a function for managing the image forming apparatus 100 instead of a general function of the image forming apparatus 100, such as printing, scanning, etc.

In operation 1102, the image forming apparatus 100 may obtain OTA information from a user. The image forming apparatus 100 may directly receive OTA information via a user interface, or may obtain a file including OTA information from an external source.

In operation 1103, the image forming apparatus 100 may check whether or not the obtained OTA information is previously stored information. According to an example, the image forming apparatus 100 may check whether or not the obtained OTA information is stored in a storage unit or an authentication server.

In operation 1104, the image forming apparatus 100 may check an authority corresponding to the OTA information. The image forming apparatus 100 may check an available function of the image forming apparatus 100 through the OTA information.

In operation 1105, the image forming apparatus 100 may check the number of possible authentications corresponding to the OTA information. The number of possible authentications corresponding to the OTA information may be determined when the OTA information is generated and may be changed by updating or correcting the OTA information.

In operation 1106, the image forming apparatus 100 may proceed to operation 1107 when the image forming apparatus 100 determines that the number of possible authentications is greater than 0, and may proceed to operation 1112 and display an authentication error message when the number of possible authentications is 0.

In operation 1107, the image forming apparatus 100 may check whether or not the OTA information includes a valid authentication period during which authentication may be performed. The image forming apparatus 100 may compare a time when the OTA information is obtained with a preset valid period.

When the image forming apparatus 100 determines that the OTA information includes the valid authentication period, the image forming apparatus 100 may proceed to operation 1110 and display an authentication success message. When the image forming apparatus 100 determines that a valid period corresponding to the OTA information expires, the image forming apparatus 100 may proceed to operation 1112 and display an authentication error message.

Also, when the image forming apparatus 100 determines that the OTA information includes the valid authentication period, the image forming apparatus 100 may proceed to operation 1108 and deduct the number of possible authentications by 1. For example, when authentication is completed by using the OTA information whose number of possible authentications is 5, the number of possible authentications may be changed to 4.

The image forming apparatus 100 may store the OTA information including the changed number of possible authentications in operation 1109.

In operation 1111, the image forming apparatus 100 may display a function corresponding to the OTA information.

The examples described above can be implemented as computer-executable instructions and as a computer-readable recording medium that stores data. At least one of the instructions and data may be stored as program code, and when executed by a processor, may generate a predefined program module to perform a predefined operation. Examples of a non-transitory computer-readable recording medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks (SSD), and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. For example, the computer-readable recording medium may be the memory 140 of the image forming apparatus 100 or the memory of the user interface device 110.

While one or more examples have been described with reference to the figures, it will be understood by those of ordinary skill in the art that various changes in form and details may be made therein. For example, even if the techniques described herein are implemented in a different order from the method described herein and/or the elements described herein, such as a system, a structure, an apparatus, and a circuit, are coupled or combined in a different form from the method described herein or are replaced or substituted with other elements or equivalents, a proper result may be achieved.

Therefore, the scope of the disclosure is defined not by the examples described herein but by the following claims and equivalents thereof.

The invention claimed is:

1. An image forming apparatus comprising:
   a processor; and
   a memory storing instructions executable by the processor,
   wherein the processor executes the instructions to:
      obtain a file of one-time authentication information from an external device;
      authenticate the obtained one-time authentication information based on a structure of the file of the one-time authentication information obtained from the external device by using previously stored one-time authentication information, wherein the previously stored one-time authentication information is generated by using user information and image forming apparatus information; and
      display a user interface where a function corresponding to the authenticated one-time authentication information is activated according to a result of the authentication.

2. The image forming apparatus of claim 1, wherein the processor further executes the instructions to:
   check whether one-time authentication information that is identical with the obtained one-time authentication information is stored in the image forming apparatus, and
   when the one-time authentication information is stored in the image forming apparatus, check user authority corresponding to the one-time authentication information.

3. The image forming apparatus of claim 1, wherein the processor further executes the instructions to request additional authentication information according to the result of the authentication.

4. The image forming apparatus of claim 1, wherein the processor further executes the instructions to generate one-time authentication information that comprises at least one of user information, image forming apparatus information, information regarding a user's authority, information regarding a function available to the user, or a number of possible authentications of the one-time authentication information.

5. The image forming apparatus of claim 4, wherein the processor further executes the instructions to transmit the generated one-time authentication information to a user contact address corresponding to the user information.

6. The image forming apparatus of claim 1, wherein the processor further executes the instructions to deduct, when the authenticating of the one-time authentication information is completed, a number of possible authentications corresponding to the one-time authentication information by 1.

7. The image forming apparatus of claim 1, wherein the processor further executes the instructions to block, when a number of possible authentications corresponding to the one-time authentication information is 0, access via the one-time authentication information.

8. The image forming apparatus of claim 1, wherein the processor further executes the instructions to display at least one of an authentication success message, an authentication error message, or an authentication expiration message according to the result of the authentication.

9. The image forming apparatus of claim 1, wherein the processor further executes the instructions to obtain identification (ID) of the one-time authentication information from a user.

10. The image forming apparatus of claim 1, wherein the image forming apparatus information includes a serial number of the image forming apparatus, internet protocol version 4 (IPv4) information of the image forming apparatus, or identification information of the image forming apparatus.

11. A non-transitory machine-readable storage medium having encoded therein instructions executable by a processor to:
   obtain a file of one-time authentication information from an external device;
   authenticate the obtained one-time authentication information based on a structure of the file of the one-time authentication information obtained from the external device by using previously stored one-time authentication information, wherein the previously stored one-time authentication information is generated by using user information and image forming apparatus information; and display a user interface where a function corresponding to the authenticated one-time authentication information is activated according to a result of the authentication.

12. An image forming apparatus comprising:
a processor; and
a memory storing instructions executable by the processor,
wherein the processor executes the instructions to:
generate and store one-time authentication information by using user information and image forming apparatus information;
transmit the generated one-time authentication information to a user contact address corresponding to the user information;
obtain one-time authentication information from a user;
authenticate the obtained one-time authentication information by using the previously stored one-time authentication information; and
display a user interface where a function corresponding to the authenticated one-time authentication information is activated according to a result of the authentication.

13. The image forming apparatus of claim 12, wherein the processor further executes the instructions to:
check whether one-time authentication information that is identical with the obtained one-time authentication information is stored in the image forming apparatus, and
when the one-time authentication information is stored in the image forming apparatus, check user authority corresponding to the one-time authentication information.

14. The image forming apparatus of claim 12, wherein the processor further executes the instructions to request additional authentication information according to the result of the authentication.

15. The image forming apparatus of claim 12, wherein the instructions to generate the one-time authentication information comprise instructions to generate one-time authentication information including at least one of the user information, the image forming apparatus information, information regarding a user's authority, information regarding a function available to the user, or a number of possible authentications of the one-time authentication information.

16. The image forming apparatus of claim 12, wherein the processor further executes the instructions to deduct, when the authenticating of the one-time authentication information is completed, a number of possible authentications corresponding to the one-time authentication information by 1.

17. The image forming apparatus of claim 12, wherein the processor further executes the instructions to block, when a number of possible authentications corresponding to the one-time authentication information is 0, access via the one-time authentication information.

18. The image forming apparatus of claim 12, wherein the processor further executes the instructions to display at least one of an authentication success message, an authentication error message, or an authentication expiration message according to the result of the authentication.

19. The image forming apparatus of claim 12, wherein the processor further executes the instructions to at least one of obtain identification (ID) of the one-time authentication information from the user or obtain a file of the one-time authentication information from an external device.

20. The image forming apparatus of claim 19, wherein the processor further executes the instructions to authenticate the one-time authentication information, based on a structure of the file of the one-time authentication information obtained from the external device.

* * * * *